United States Patent [19]

Elings et al.

[11] Patent Number: 4,954,704

[45] Date of Patent: Sep. 4, 1990

[54] METHOD TO INCREASE THE SPEED OF A SCANNING PROBE MICROSCOPE

[75] Inventors: Virgil B. Elings, Santa Barbara; Peter Maivald, Goleta, both of Calif.

[73] Assignee: Digital Instruments, Inc., Santa Barbara, Calif.

[21] Appl. No.: 445,280

[22] Filed: Dec. 4, 1989

[51] Int. Cl.$^5$ ............................................. H01J 37/26
[52] U.S. Cl. .................................... 250/307; 250/306
[58] Field of Search ................................ 250/306, 307

[56] References Cited

U.S. PATENT DOCUMENTS

| | | | |
|---|---|---|---|
| 4,747,698 | 5/1988 | Wickramasinghe et al. | 250/306 |
| 4,814,622 | 3/1989 | Gregory et al. | 250/306 |
| 4,902,892 | 2/1990 | Okayama et al. | 250/307 |

*Primary Examiner*—Jack I. Berman
*Assistant Examiner*—Kiet T. Nguyen
*Attorney, Agent, or Firm*—Donald A. Streck

[57] ABSTRACT

In a scanning probe microscope having a probe moved by a piezoelectric 3-dimensional positioner in perpendicular X and Y directions over the surface of a sample to create a raster scan thereof and feedback controlled and sensed in a Z direction vertical to the surface to gather data about the topography of the surface, this is a method of operating the piezoelectric 3-dimensional positioner to increase the speed of gathering data about a scanning area of the surface being scanned. The method comprises the steps of, causing the positioner to traverse the surface from a first edge of the scanning area with the probe in a +X direction at a first rate of speed while feedback controlling and sensing the Z direction; causing the positioner to lift the probe above the surface a clearance distance at a second edge of the scanning area opposite the first edge in the +X direction; and, causing the positioner to return the probe to the first edge in a −X direction without feedback control thereof at a second rate of speed which is faster than the first rate of speed.

28 Claims, 3 Drawing Sheets

METHOD TO INCREASE THE SPEED OF A SCANNING PROBE MICROSCOPE

BACKGROUND OF THE INVENTION

This invention relates to scanning probe microscopes and, more particularly, to a method of operation thereof in order to increase the image-taking speed of the device. Scanning probe microscopes, such as the scanning tunneling microscope and the atomic force microscope, operate by scanning a probe over a surface in which the probe is very close to the surface or contacts the surface very lightly. In a scanning tunneling microscope, the tip is at a distance of just a few atoms from the surface in order for a tunneling current to flow the probe tip to the surface. The tunneling current is used in a feedback system which regulates the vertical height of the probe to keep the current, and therefore the distance of the probe from the surface, constant. In an atomic force microscope, the tip is mounted on a bendable arm which is instrumented such that bending of the arm can be measured in order to obtain the force acting on the tip. This force can be one which attracts the tip to the surface, such as a Van der Waals force, or a magnetic field force or replulsive force, when the tip is in contact with the surface. This force is typically used in feedback system to regulate the height of the probe or sample to keep the force constant during the scan. Other probes which have been used include thermal probes, electric field probes, and light probes.

As the field of scanning probe microscopes has expanded, the need for very large scans (and corresponding implementation thereof) has increased, in turn slowing down the time it takes to acquire an image because of the large area that must be covered with the tip close to the surface. The inventors herein, for instance, have made scanners for a scanning tunneling microscope which can scan over a 90 by 90 micron area. In prior co-pending application serial number 361,545, filed 5 June 1989 by Virgil Elings and John Gurley entitled JUMPING PROBE MICROSCOPE, assigned to the common assignee of this invention, one approach to help speed up these large scans is shown. This application is directed to yet another approach to increasing the scanning rate of scanning probe microscopes.

In all scanning probe microscopes, the probe is moved in a raster scan, back and forth in X as the probe moves slowly in Y, the perpendicular direction, with the feedback systems always operating to control Z, the vertical direction; otherwise, the probe would strike the surface. Data is taken only in one direction in X. Because of the hysteresis in the scanners, the data in the two directions does not agree exactly and therefore cannot be used to make a single image. The tip cannot be moved more quickly in the direction in which the data is not used since the probe is already moving as fast as it can without hitting the surface and damaging the probe.

Wherefore, it is the object of this invention to provide a method of operation with standard scanning probe microscopes which will decrease the time required to complete a total scan of a surface and ontain data therefrom.

Other objects and benefits of the invention will become apparent from the detailed description which flows herein after when taken with the drawing figures which accompany it.

SUMMARY

The foregoing object has been achieved in a scanning probe microscope having a probe moved by a piezoelectric 3-dimensional positioner in perpendicular X and Y directions over the surface of a sample to create a raster scan thereof and feedback controlled and sensed in a Z direction vertical to the surface to gather data about the topography of the surface, by the method of the present invention for operating the piezoelectric 3-dimensional positioner to increase the speed of gathering data about a scanning area of the surface being scanned comprising the steps of, causing the positioner to traverse the surface from the first edge of the scanning area with the probe in a +X direction at a first rate of speed while feedback controlling and sensing the Z direction; causing the positioner to lift the probe above the surface a clearance distance at a second edge of the scanning area opposite the first edge in the +X direction; and, causing the positioner to return the probe to the first edge in a −X direction without feedback control thereof at a second rate of speed which is faster than the first rate of speed.

In one embodiment, said step of causing the positioner to return the probe to the first edge in a −X direction comprises causing the positioner to move the probe in the −X direction while maintaining the probe at substantially the constant clearance distance above the surface.

In another embodiment, said step of causing the positioner to lift the probe above the surface a clearance distance comprises causing the positioner to lift the probe to a point which is a pre-established distance Δ above the highest point in the previous scan line and said step of causing the positioner to return the probe to the first edge in a −X direction comprises causing the positioner to move the probe in the −X direction while maintaining the probe at the level set in the previous step. The preferred method additionally comprises the step of causing the positioner to move the probe in a Y direction only upon reaching the first edge after said step of causing the positioner to return the probe to the first edge in a −X direction. Preferably, there are also the steps of while the positioner in returning the probe to the first edge in a −X direction, sensing if the probe strikes the surface and if the probe strikes the surface while returning the probe to the first edge in a −X direction, increasing Δ as employed in said step of causing the positioner to lift the probe above the surface a clearance distance comprises causing the positioner to lift the probe to a point which is a pre-established distance Δ above the highest point in the previous scan line.

Preferably, the method additionally comprises the step of, upon reaching the first edge after said step causing the positioner to return the probe to the first edge in a −X direction, causing the positioner to pause for a suffcient time to allow the piezoelectric material thereof to settle whereby hysteresis effects on the probe are reduced. The preferred time of the pause is substantially the same as the time for said step of causing the positioner to return the probe to the first edge in a −X direction.

In another approach, the method additionally comprises the steps of saving the height data associated with scanning the probe in the +X direction and during said step of causing the positioner to return the probe to the first edge in a −X direction, causing the positioner to use the saved height data to cause the positioner to maintain the probe at a distance Δ above the surface where it will not strike the surface. The preferred method of this approach additionally comprises the step of causing the positioner to move the probe in a Y direction only upon reaching the first edge after said step of causing the positioner to return the probe to the first edge in a −X direction. It also includes the steps of, while the positioner is returning the probe to the first edge in a −X direction, sensing if the probe strikes the surface and if the probe strikes the surface while the positioner is returning the probe to the first edge in a −X direction, causing the positioner to increase Δ as employed in said step of causing the positioner to use the saved height data to maintain the probe at a distance Δ above the surface. Also, upon reaching the first edge after sai step of causing the positioner to return the probe to the first edge in a −X direction, causing the positioner to pause for a sufficient time to allow the piezoelectric material thereof to settle whereby hysteresis effects on the probe are reduced wherein the time of the pause is substantially the same as the time for said step of causing the positioner to return the probe to the first edge in a −X direction.

DESCRIPTION OF THE PREFERRED EMBODIMENT

To accomplish its stated object, this invention involves a new feedback system for use in a typical prior art scanning probe microscope. In the method of operating the feedback system according to the method of this invention, the probe is moved away from the surface at the end of the X scan direction and then the probe is moved quickly back across the surface to begin another scan line, with little possibility of the probe striking the surface. On this fast return scan, the feedback system does not operate to have the probe follow over the surface (as in all known prior art); but rather, operates to make sure that the tip is well away from the surface so that there is little possibility of the tip hitting. In some embodiments to be disclosed, the data from the previous scan line is used to determine how high the tip is lifted for the fast return.

As mentioned earlier, all scanning probe microscopes now operate with the tip near or on the surface of the sample, with the scan speed the same in both the +X and −X direction. In another prior copending application Ser. No. 344,750, filed 28 April 1989 by Virgil Elings and John Gurley entitled METHOD OF DRIVING A PIEZOELECTRIC SCANNER LINEARLY WITH TIME, also assigned to the common assignee of this invention, a method of making the +X and −X scans almost identical was disclosed. It was pointed out in that application that by using the method thereof, data from the both the +X and −X scans could be used in order to make an image twice as fast. The present invention gives almost this factor of speed increase, but without the need to linearize the scan.

Figure 1:
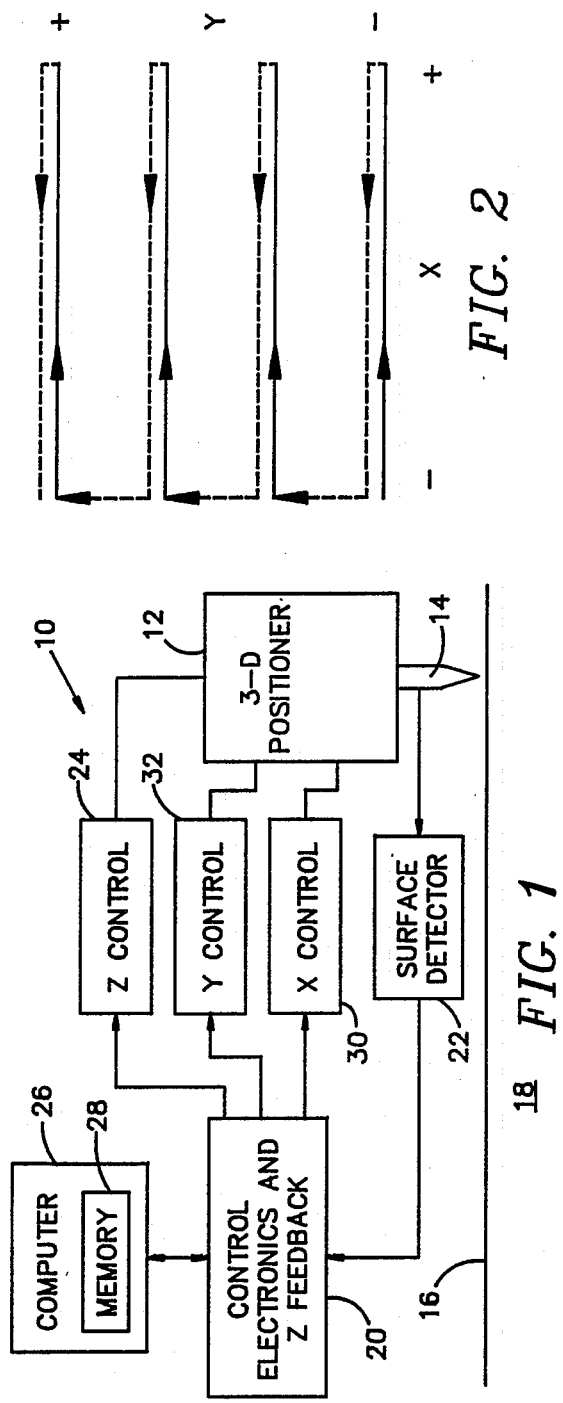
FIG. 1 is a simplified functional block diagram of a typical scanning probe microscope which can be operated according to the present invention.

FIG. 1 shows a block diagram of apparatus which can be employed to effect the method of this invention for incresing the speed of a scanning probe microscope, generally indicated as 10. A 3-dimensional positioner 12, usually a piezoelectric device, scans the probe 14 relative to the surface 16 of a sample 18 in a raster scan, faster in X than in the perpendicular direction Y. The probe 14 is also controlled in the vertical direction Z by a feedback loop and return control in the control electronics 20. Surface detector electronics 22 sense the position of the probe 14 above the surface 16 and input a signal reflecting the position of the probe 14 to the control electronics 20. In a scanning tunneling microscope this would be a current between the tip of the probe 14 and the surface 16, and in an atomic force microscope this would be a signal giving the force between the probe 14 and the sample 18. The control electronics 20, in turn, outputs a feedback signal to the Z control electronics 24 which provides the Z positional signal into the 3-dimensional positioner 12. This feedback loop typically keeps the probe 14 a constant distance from the surface 16 or at a constant force on the surface 16. The control electronics 20 is, of course, connected to be controlled by the system control computer 26 containing memory 28 and, additionally, outputs positional requests to the X and Y control electronics 30, 32, respectively, which provide the X and Y positional signals into the 3- dimensional positioner 12.

Figure 2:
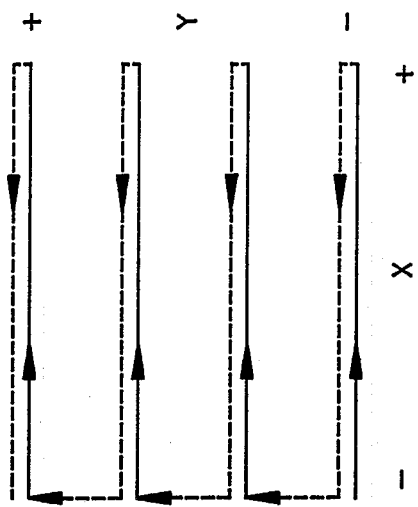
FIG. 2 is a simplified diagram of one mode of operating the probe of the scanning probe microscope of FIG. 1 according to the present invention.
Figure 3:
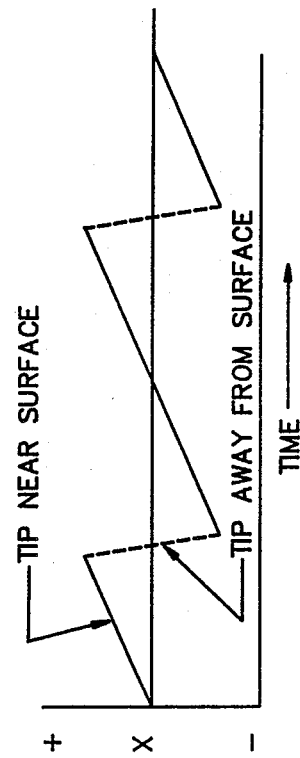
FIG. 3 is a simplified diagram showing how in the method of the present invention the probe makes its return in the −X direction at a speed which is faster than its scan speed in the +X direction.

In one implementation of this invention, at the end of a scan line in, say, the +direction, the probe 14 is moved from the surface 16 in order not to strike the surface 16 on the return and then the return in the −direction is made at a much higher velocity than in the −X direction. In the +X direction, the speed is limited by the fact that the tip of the probe 14 is near the surface 16 and the Z motion has a finite speed to correct for changes in the height of the sample, and therefore the horizontal speed must remain low. This type of scan according to this embodiment of the present invention is shown in FIGS. 2 and 3. In FIG. 2, the raster scan in the horizontal plane is shown, with the solid line portion of the scan indicating where the probe 14 is near the sample 18 collecting data about the surface 16, and the dotted line portion of the scan indicating where the tip of the probe 14 is lifted above the surface 16 during the fast motions and is not collecting data. The raster scan depicted shows the tip of the probe 14 returning over the same path; but, Y could be varied continuously or at either end of the scan. FIG. 3 shows how the X position of the probe 14 varies with time, being faster in the direction where the tip of the probe 14 is lifted from the surface 16.

Figure 4:
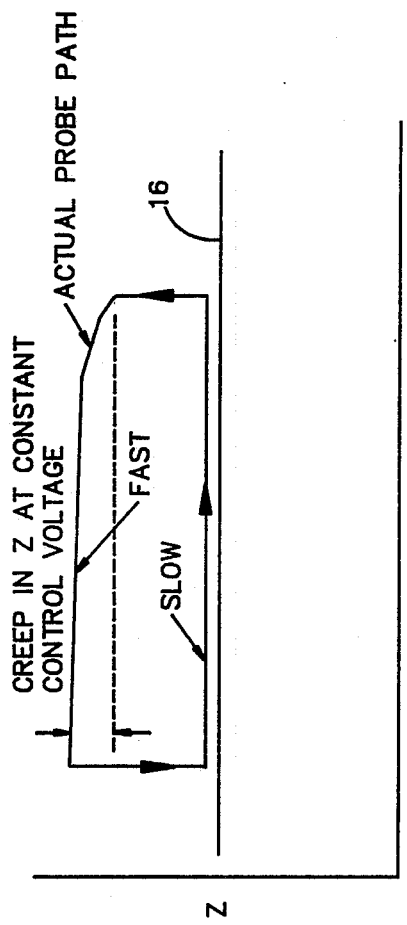
FIG. 4 is a simplified drawing showing the effect of creep and hysteresis in the piezoelectric probe positioner as they effect the present invention.
Figure 5:
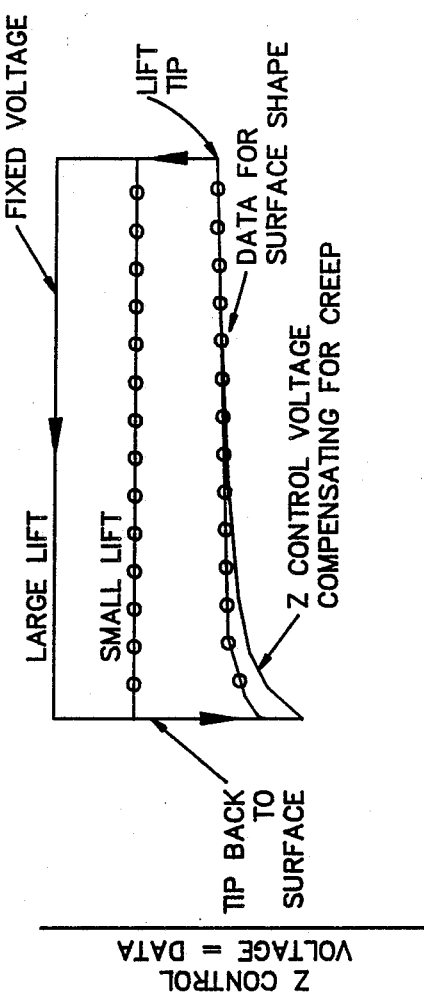
FIG. 5 is a simplified drawing showing how the hysteresis decreases when the height the tip is lifted decreases.

As known in the art, piezoelectronic positioners (such as 12 of FIG. 1) have hysteresis and creep which causes the material to continue to expand or contract for a time even after an excitation voltage applied thereto ceases to change. The hysteresis and creep effect is larger for larger motions of the positioner. This means that if the probe 14 is pulled off the surface 16 at the end of the scan line and then placed down on the surface 16 at the beginning of the next scan line, the positioner 12, when given a constant voltage, will want to continue moving the probe 14 down and this will be compensated for in the feedback loop with a Z control voltage which must increase just to keep the probe 14 at the same height. So, with this creep, the Z control voltage will increase at the beginning of a scan line, even when the surface 16 of the sample 18 is flat, giving a false shape to the surface 16 since the Z control voltage is used to determine the topography of the surface 16. The effect of this creep is shown in FIGS. 4 and 5. As depicted in FIG. 4, if the Z control voltage is held constant on the return path, the piezo material of the positioner 12 will creep upward, a continuation of the motion of lifting the tip of the probe 14 (hence the word, creep). On the forward (+X) path, as the tip of the probe 14 goes across the flat surface 16, the feedback loop will cause the tip of the probe 14 to follow the surface 16. But, the data about the surface 16 is obtained from the Z control voltage and it will be increasing, as shown in FIG. 5, to compensate for the creeping downward of the probe, which was initiated by the motion of the tip of the probe 14 back to the surface 16. If the tip of the probe 14 were not lifted as far, as shown by the path with the open cicles, the effect would not be as much, as shown in FIG. 5. It is useful, therefore, to not have the tip of the probe 14 pulled too far above the surface 16. Otherwise, this creep hysteresis will adversely affect the measurement of the topography of the surface 16.

Figure 6:
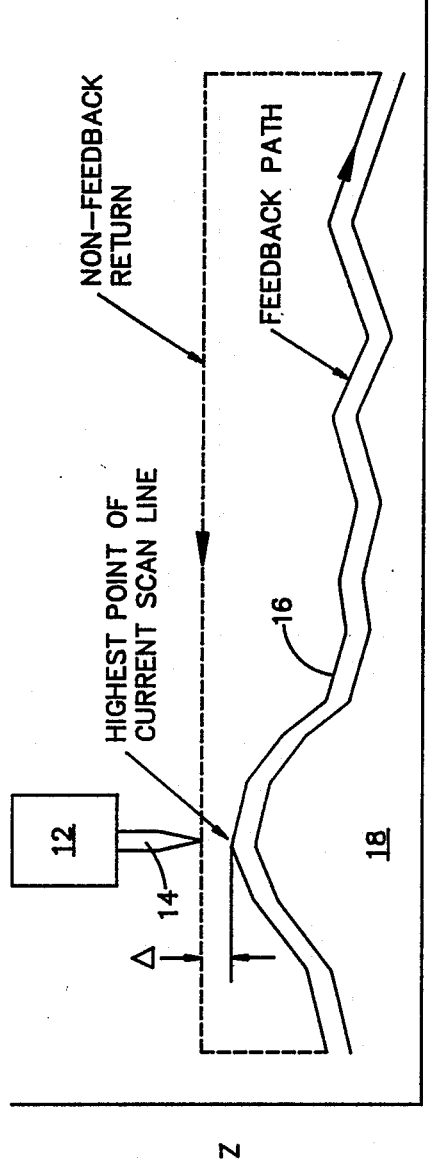
FIG. 6 is a simplified drawing showing one approach of the method of the present invention where the probe is lifted to a point which is a clearance distance above the heighest point of the previously scanned line.

An alternate approach is to use the topography data from the previous scan line to determine the vertical trajectory of the probe 14 on the return path. A simplified drawing of this method is shown in FIG. 6. Here, the heighest point on the previous scan line is used to determine how high the tip of the probe 14 should be raised for the return path. The tip of the probe 14 is raised an amount so it will return at a height $\Delta$ above the highest point. The inventors herein have implemented this method, using a digital signal processor to control the vertical motion of the probe, both in the feedback mode for taking data and for calculating and exectutng the return paths. In order for the last scan line to represent the topography for the return path, it is preferable that the motion of the probe 14 in the Y direction occur at the end of the return path after the probe 14 is put down near the surface 16 and is being controlled in the feedback mode. That is, it is preferred that the Y position for the +X scan and -X return be the same and that the tip of the probe 14 be moved in Y only when the probe 14 is sensing the surface 16 so that any large changes in the topography in the Y direction can be dealt with in the feedback mode. This is the approach depicted in FIG. 2.

Another method of reducing the creep in the data due to raising and lowering the tip of the probe 14 on the return path is to pause after the tip of the probe 14 is put down near the surface 16 for the next scan line. The time scale for the creep is related to the time during which the probe 14 is raised above the surface 16; so, most of the creep will be gone if there is a waiting period after the probe 14 is brought back near the surface 16 before the next scan line is started. This time could be spent moving the probe 14 in the Y direction for the next scan line. This pause would be about as long as the time the tip of the probe 14 is raised from the surface 16 during the return path.

Figure 7:
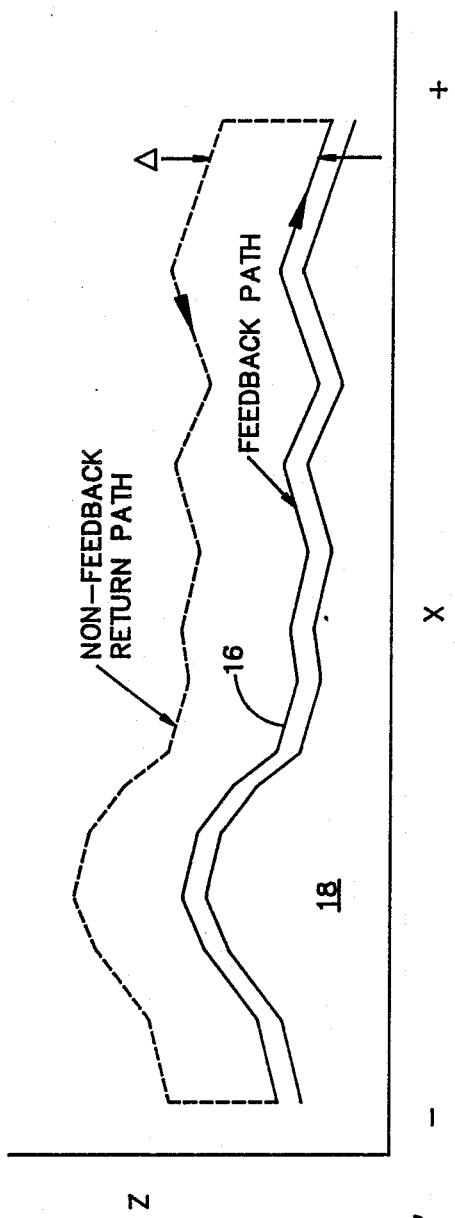
FIG. 7 is a simplified drawing depicting another approach of the method of the present invention where the probe is maintained at a clearance distance above the previously scanned line during its return.

Yet another method of executing the return path is to follow the topography of the previous scan line but at an increased distance from the surface 16. This method is shown in FIG. 7. For a scanning tunneling microscope in the feedback mode, the tip of the probe 14 is only a few atoms above the surface 16; hence, the scanning rate must be slow to avoid hitting the surface 16. If the tip of the probe 14 is raised much higher above the surface 16, there is no tunneling current and therefore the feedback mode cannot operate. In a very large scan, about 60,000 steps are made on each scan line, with the feedback system positioning the tip of the probe 14 vertically at each step. If some or all of this topography data is saved in the computer memory 28, then it can be used on the return path to keep the tip of the probe 14 spaced a certain distance from the surface 16 at all points so it can be moved quickly in X with no collisions occurring. For instance, the tip of the probe 14 could be raised say 100 nanometers above the surface 16 and moved in the -X direction in 600 steps, where at each step the vertical position of the probe would be corrected to keep the probe to surface 16 distance $\Delta$ essentially constant. If these steps were taken at the same rate as the steps in the forward scan direction the return time would be 1/100 of the scan time. With a pause time equal to this, the return time would still be only 1/50th of the scan time; so, the scan would be about twice as fast as it would be if the tip of the probe 14 were left in the feedback mode on the return as is now done with scanning tunneling microscopes. Also, an added benefit is that the tip of the probe 14 would last twice as long since there would be no collisions with the surface 16 on the return as there are now in the feedback mode. on the path, the tunneling current could be checked by the instrument to see if the tip of the probe 14 collided with the surface 16. If so, the distance $\Delta$ could be increased on subsequent scan lines to reduce these collisions. Also, the return path could be corrected to make up for creep and nonlinearities in the scanner. At the end of one frame of data, the tip of the probe 14 could be lifted and then quickly moved to the beginning of a new frame, although this is not so important since it could also be moved in the feedback mode with little change in the time to collect one frame of data. It would just add the time of one scan line but there are typically 200 scan lines in an image.

In all of the foregoing descriptions, X and Y are perpendicular axes; but, the directions of +x and +Y with respect to the sample are arbitrary. Also, the directions of the axes could change from scan to scan since it may be advantageous in some cases to scan the sample in different directions. The electrodes on the scanner could be energized in such a way to make the X and Y axes in any direction with respect to the sampler or to reverse X or Y, i.e., +X could be changed to -X. All of these variations do not affect the basic point of novelty of this invention which is the lifting of the tip and speeding up of the return scan.

Wherefore, having thus described our invention, what is claimed is:

1. In a scanning probe microscope having a probe moved in perpendicular X and Y directions over the surface of a sample to create a raster scan thereof and controlled and sensed in a Z direction vertical to the surface to gather data about the topography of the surface, the method of operation for increasing the speed of gathering data about the surface being scanned comprising the steps of:
   (a) traversing the surface from a first edge of a scanning area with the probe in a +X direction at a first rate of speed while feedback controlling and sensing the Z direction;
   (b) lifting the probe above the surface a clearance distance at a second edge of the scanning area opposite the first edge in the +X direction; and,
   (c) returning the probe to the first edge in a −X direction without feedback control thereof at a second rate of speed which is faster than the first rate of speed.

2. The method of claim 1 wherein:
said step of returning the probe to the first edge in a −X direction comprises moving the probe in the −X direction while maintaining the probe at substantially a constant height.

3. The method of claim 1 wherein:
   (a) said step of lifting the probe above the surface a clearance distance comprises lifting the probe to a point which is a pre-established distance Δ above the highest point in the previous +X scan; and,
   (b) said step of returning the probe to the first edge in a −X direction comprises moving the probe in the −X direction while maintaining the probe at the level set in step (a).

4. The method of claim 3 wherein:
the probe is moved in a Y direction only upon reaching the first edge after said step of returning the probe to the first edge in a −X direction.

5. The method of claim 3 and additionally comprising the steps of:
   (a) while returning the probe to the first edge in a −X direction, sensing if the probe strikes the surface; and,
   (b) if the probe strikes the surface while returning the probe to the first edge in a −X direction, increasing Δ as employed in said step of lifting the probe above the surface a clearance distance comprises lifting the probe to a point which is a pre-established distance Δ above the highest point in the previous scan line.

6. The method of claim 3 and additionally comprising the step of:
upon reaching the first edge after said step of returning the probe to the first edge in a −X direction, pausing for a sufficient time to allow any piezoelectric material used to position the probe to settle whereby hysteresis effects of the scanner are reduced.

7. The method of claim 6 wherein:
the time of the pause is substantially the same as the time for said step of returning the probe to the first edge in a −X direction.

8. The method of claim 6 wherein:
the pause occurs as the probe is being moved in the +Y direction.

9. The method of claim 1 and additionally comprising the steps of:
   (a) saving the height data associated with scanning the probe in the +X direction; and,
   (b) during said step of returning the probe to the first edge in a −X direction, using the saved height data to maintain the probe at a distance Δ above the surface where it will not strike the surface.

10. The method of claim 9 wherein:
the probe is moved in a Y direction only upon reaching the first edge after said step of returning the probe to the first edge in a −X direction.

11. The method of claim 10 and additionally comprising the steps of:
   (a) while returning the probe to the first edge in a −X direction, sensing if the probe strikes the surface; and,
   (b) if the probe strikes the surface while returning the probe to the first edge in a −X direction, increasing Δ as employed in said step of using the saved height data to maintain the probe at a distance Δ above the surface.

12. The method of claim 9 and additionally comprising the step of:
upon reaching the first edge after said step of returning the probe to the first edge in a −X direction, pausing for a sufficient time to allow any piezoelectric material used to position the probe to settle whereby hysteresis effects on the probe are reduced.

13. The method of claim 12 wherein:
the time of the pause is substantially the same as the time for said step of returning the probe to the first edge in a −X direction.

14. The method of claim 12 wherein:
the pause occurs as the probe is being moved in the +Y direction.

15. In a scanning probe microscope having a probe moved by a piezoelectric 3-dimensional positioner in perpindicular X and Y directions over the surface of a sample to create a raster scan thereof and feedback controlled and sensed in a Z direction vertical to the surface to gather data about the topography of the surface, the method of operating the pieoelectric 3-dimensional positioner to increase the speed of gathering data about a scanning area of the surface being scanned comprising the steps of:
   (a) causing the positioner to traverse the surface from a first edge of the scanning area with the probe in a +X direction at a first rate of speed while feedback controlling and sensing the Z direction;
   (b) causing the positioner to lift the probe above the surface a clearance distance at a second edge of the scanning area opposite the first edge in the +X direction; and,
   (c) causing the positioner to return the probe to the first edge in a −X direction without feedback control thereof at a second rate of speed which is faster than the first rate of speed.

16. The method of claim 15 wherein:
said step of causing the positioner to return the probe to the first edge in a −X direction comprises causing the positioner to move the probe in the −X direction while maintaining the probe at substantially the constant clearance distance above the surface.

17. The method of claim 15 wherein:
   (a) said step of causing the positioner to lift the probe above the surface a clearance distance comprises causing the positioner to lift the probe to a point which is a pre-established distance Δ above the highest point in the previous scan line; and, (b) said step of causing the positioner to return the probe to the first edge in a −X direction comprises causing the positioner to move the probe in the −X direction while maintaining the probe at the level set in step (a).

18. The method of claim 17 and additionally comprising the step of:

causing the positioner to move the probe in a Y direction only upon reaching the first edge after said step of causing the positioner to return the probe to the first edge in a −X direction.

19. The method of claim 17 and additionally comprising the steps of:

(a) while the positioner is returning the probe to the first edge in a −X direction, sensing if the probe strikes the surface; and, (b) if the probe strikes the surface while returning the probe to the first edge in a −X direction, increasing Δ as employed in said step of causing the positioner to lift the probe above the surface a clearance distance comprises causing the positioner to lift the probe to a point which is a pre-established distance Δ above the highest point in the previous scan line.

20. The method of claim 17 and additionally comprising the step of:

upon reaching the first edge after said step of causing the positioner to return the probe to the first edge in a −X direction, causing the positioner to pause for a sufficient time to allow the piezoelectric material thereof to settle whereby hysteresis effects on the probe are reduced.

21. The method of claim 20 wherein:

the time of the pause is substantially the same as the time for said step of causing the positioner to return the probe to the first edge in a −X direction.

22. The method of claim 20 wherein:

the pause occurs after the tip is brought back down near the surface in preparation for another scan.

23. The method of claim 15 and additionally comprising the steps of:

(a) saving the height data associated with scanning the probe in the +X direction; and, (b) during said step of causing the positioner to return the probe to the first edge in a −X direction, causing the positioner to use the saved height data to cause the positioner to maintain the probe at a distance Δ above the surface where it will not strike the surface.

24. The method of claim 23 and additionally comprising the step of:

causing the positioner to move the probe in a Y direction only upon reaching the first edge after said step of causing the positioner to return the probe to the first edge in a −X direction.

25. The method of claim 24 and additionally comprising the steps of:

(a) while the positioner is returning the probe to the first edge in a −X direction, sensing if the probe strikes the surface; and, (b) if the probe strikes the surface while the positioner is returning the probe to the first edge in a −X direction, causing the positioner to increase Δ as employed in said step of causing the positioner to use the saved height data to maintain the probe at a distance Δ above the surface.

26. The method of claim 23 and additionally comprising the step of:

upon reaching the first edge after said step of causing the positioner to return the probe to the first edge in a −X direction, causing the positioner to pause for a sufficient time to allow the piezoelectric material thereof to settle whereby hysteresis effects on the probe are reduced.

27. The method of claim 26 wherein:

the time of the pause is substantially the same as the time for said step of causing the positioner to return the probe to the first edge in a −X direction.

28. The method of claim 26 wherein:

the pause occurs after the tip is brought back down near the surface in preparation for another scan.

* * * * *